United States Patent
Carazzone et al.

(10) Patent No.: US 7,987,074 B2
(45) Date of Patent: Jul. 26, 2011

(54) EFFICIENT COMPUTATION METHOD FOR ELECTROMAGNETIC MODELING

(75) Inventors: James J. Carazzone, Houston, TX (US); T. Edward Clee, Chappell Hill, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 428 days.

(21) Appl. No.: 12/161,991

(22) PCT Filed: Feb. 12, 2007

(86) PCT No.: PCT/US2007/003762
§ 371 (c)(1), (2), (4) Date: Jul. 24, 2008

(87) PCT Pub. No.: WO2007/102973
PCT Pub. Date: Sep. 13, 2007

(65) Prior Publication Data
US 2009/0006053 A1  Jan. 1, 2009

Related U.S. Application Data

(60) Provisional application No. 60/780,232, filed on Mar. 8, 2006.

(51) Int. Cl.
*G06F 17/50* (2006.01)
(52) U.S. Cl. ............... 703/2; 703/10; 166/53; 166/66.5; 166/302
(58) Field of Classification Search .................. 703/2, 5, 703/10; 166/53, 66, 66.5, 302
See application file for complete search history.

(56) References Cited

U.S. PATENT DOCUMENTS

| 6,131,071 A | 10/2000 | Partyka et al. ................... 702/16 |
| 6,337,568 B1 | 1/2002 | Tutunji et al. ................. 324/303 |
| 6,603,313 B1 | 8/2003 | Srnka ............................ 324/354 |
| 2003/0173072 A1* | 9/2003 | Vinegar et al. ............... 166/66.5 |
| 2003/0201098 A1* | 10/2003 | Karanikas et al. .............. 166/53 |

(Continued)

FOREIGN PATENT DOCUMENTS
WO    WO 2007/102973    9/2007

OTHER PUBLICATIONS
International Search Report dated Nov. 24, 2007 for PCT/US07/03762 filed Feb. 12, 2007.

(Continued)

*Primary Examiner* — Thai Phan
(74) *Attorney, Agent, or Firm* — ExxonMobil Upstream Research Company Law Dept.

(57) ABSTRACT

Method for efficient processing of controlled source electromagnetic data, whereby Maxwell's equations are solved [107] by numerical techniques [109] such as finite difference or finite element in three dimensions for each source location and frequency of interest. The Reciprocity Principle is used [103] to reduce the number of computational source positions, and a multi-grid is used [105] for the computational grid to minimize the total number of cells yet properly treat the source singularity, which is essential to satisfying the conditions required for applicability of the Reciprocity Principle. An initial global resistivity model [101] is Fourier interpolated to the computational multi grids [106]. In inversion embodiments of the invention, Fourier prolongation is used to update [120] the global resistivity model based on optimization results from the multi-grids.

21 Claims, 5 Drawing Sheets

U.S. PATENT DOCUMENTS

2005/0072483 A1* 4/2005 Rioufol et al. .............. 138/104
2007/0209799 A1* 9/2007 Vinegar et al. .............. 166/302

OTHER PUBLICATIONS

European Search Report (2006), RS 113774, Aug. 1, 2006, 2 pgs.
Arulliah, D. A. et al (1999) "A Method for the Forward Modeling of 3D Electromagnetic Quasi Static Problems," *Mathematical Models and Methods in Applied Sciences* (M3AS), v. 11, Issue 1, pp. 1-21.
Born, M. et al. (1959), *Principles of Optics*, Pergamon Press, Oxford, UK, pp. 656-664.
Carazzone, J. J. et al. (2005) "Three Dimensional Imaging of Marine CSEM Data," *SEG 2005 Ann. Mtg.*, (XP002392915), pp. 575-579.
Chen, J. et al. (2005), "Reciprocity in electromagnetic: application to modeling marine magnetometric resistivity data," *Physics of the Earth and Planetary Interiors*, 150, pp. 45-61.
De Hoop, A. T., (1995), *Handbook of Radiation and Scattering of Waves*, Academic Press, London (ISBN 0-12-208644-4) pp. 807-878.
De Lugao, P. P et al. (1996), "Calculating the two-dimensional magnetotelluric Jacobian in finite elements using reciprocity," *Geophysical Journal International* 127, pp. 806-810.
Dennis, J. E. et al. (1983), *Numerical Methods for Unconstrained Optimization and Nonlinear Equations*, Prentice-Hall, Englewood Cliffs, New Jersey (ISBN 0-13-627216-9), pp. 220-229.
Eisner, L. et al. (2001), "A Reciprocity Method for Multi-Source Simulations," *Bulletin of the Seismological Society of America*, 91.3, pp. 553-560.
Golub, G. H. et al. (1983), *Matrix Computations*, The Johns Hopkins University Press, Baltimore, Maryland (ISBN 0-8018-3010-9), pp. 16-21.

Moskow, S. et al. (1999) "A Finite Difference Scheme for Elliptic Equations With Rough Coefficients Using a Cartesian Grid Non-Conforming to Interfaces," *SIAM Journal on Numerical Analysis* 36, pp. 442-464.
Newman, G. A. et al. (1997), "Three-dimensional massively parallel electromagnetic inversion-1. Theory," *Geophysics Journal International* 128, pp. 345-354.
Sasaki, Y., (1994), "3-D resistivity inversion using the finite-element method, *Geophysics*," 59, pp. 1839-1848.
Sasaki, Y. (2001), "Full 3-D inversion of electromagnetic data on a PC," *Journal of Applied Geophysics* 46; pp. 45-56.
Shin, C. et al. (2001), "Efficient calculation of a partial-derivative wavefield using reciprocity for seismic imaging and inversion," *Geophysics* 66, pp. 1856-1863.
Unsworth, M. et al. (1993) "Electromagnetic Induction by a finite electric dipole source over a 2-D earth," *Geophysics*, 58.2, pp. 198-214.
Wang, T. et al. (2001), "Fast Frechet derivative calculation using an auxiliary source array method: An application to array resistivity measurements," *Geophysics*, 66.5, pp. 1364-1371.
Yi, M. J. et al. (2001), "Three-Dimensional Imaging of Subsurface Structures Using Resistivity Data," *Geophysical Prospecting* 49, pp. 483-497.
Zhdanov, M. S. et al. (2005), "Integral Equation Method for 3-D Modeling of Electromagnetic Fields in Complex Structures With Inhomogeneous Background Conductivity in Marine CSEM Applications," *SEG 2005 Ann. Mtg.*, EM 1.2, pp. 510-513.

\* cited by examiner

| Fig. 1A |
| Fig. 1B |

EFFICIENT COMPUTATION METHOD FOR ELECTROMAGNETIC MODELING

This application is the National Stage of International Application No. PCT/US2006/003762, filed on 12 Feb. 2007, which claims the benefit of now expired U.S. Provisional Patent Application No. 60/780,232, filed on 8 Mar. 2006.

FIELD OF THE INVENTION

This invention relates generally to the field of geophysical prospecting, and more particularly to controlled source electromagnetic surveys exploring for oil and gas deposits located beneath the ocean. Specifically, the invention is a method for performing the Maxwell equation solutions required for full 2-D or 3-D modeling and/or inversion of controlled source electromagnetic survey data to reveal resistivity anomalies in subsurface formations.

BACKGROUND OF THE INVENTION

The offshore environment, particularly in the deep water case, offers a combination of unique circumstances that make the application of exploration methods based upon remote measurements of electrical resistivity a useful and cost effective exploration tool. These circumstances are:
1. The high cost of offshore exploration wells.
2. The very low level of electrical noise present at the ocean bottom.
3. The large resistivity contrast in many locations between oil filled reservoir rock and the surrounding brine filled sandstone and shale.
4. The excellent electrical coupling provided by seawater.
5. The operational feasibility of collecting resistivity measurements over large area.

Resistivity is a measure of the amount of electrical resistance offered by a unit volume of material; it is measured in units of ohm-m. Marine resistivity measurements are made by towing a transmitting bipole antenna (100 to 500 m long) with grounded ends approximately 50 m above the ocean bottom and recording the electric field at grounded detecting bipole antennas (typically about 5 m long) mounted on sea bottom recording devices. When a human operated EM source is used, the survey is called a controlled source electromagnetic ("CSEM") survey. The recording devices measure the electric fields along the two horizontal directions and sometimes along the vertical direction as well. The magnetic fields can be measured as well; in which case, coils are used pointing along the horizontal and vertical directions. The detecting devices store the recorded electromagnetic fields on internal disk drives. When the survey is complete, the recording devices detach themselves from their anchors in response to a signal from the survey vessel and float to the ocean surface. Eventually they are collected by the survey vessel and the recorded data is loaded into onboard computers. The recorded data is correlated with the transmitted signal, transmitter location and heading and other information based upon very accurate independent time recordings (clock readings) on the detector and onboard the ship. Clock readings are used because there is only very minimal communication between the survey vessel and the sea bottom detectors.

Data are usually analyzed in the frequency domain because only certain frequencies are useful due to the skin depth effect which predicts the decay of electromagnetic radiation in conductive materials with propagation distance. The skin depth is the distance over which the radiation carried by a plane wave (a waveform in which the surfaces of constant phase and amplitude are infinite planes perpendicular to the direction of wave propagation) in a uniform material will decay by one factor of e≈2.718 (the base of the natural logarithm system). The skin depth, $\delta$, (expressed in meters) at frequency f (in Hertz), for a material with resistivity, $\rho$, (in ohm-m) is approximately, $$\delta = (1/2\pi)\sqrt{(10^7 p/f)} \approx 503\sqrt{(p/f)}$$

In plain words this equation states that the skin depth is approximately 503 times the square-root of the ratio of the resistivity to the frequency. Thus the skin depth will be 503 m in a material of 1 ohm-m resistivity for radiation at 1 Hertz. A target located 1 km below the sea bottom in a 1 ohm-m material will only be illuminated by radiation in the low frequency range (1/10 to 1 Hertz). Above 1 Hz, the radiation will experience too much decay in propagating down to the target and back. Below approximately 1/10 Hz the radiation will average too much of the material to effectively sense typical target geometries of interest which tend to be 1 to 10 km by 1 to 10 km in the horizontal dimensions and 10 to 100 m thick. Because the data are analyzed in the frequency domain, the transmitting antenna broadcasts time domain signals which are selected to be rich in only the frequencies of interest. A square wave is often used because it is easy to produce electronically. The period (in seconds) is usually selected to be T=1/f where f is the lowest frequency of interest. The higher harmonic components of the square wave (3f; 5f, etc) help provide resolution of the resistivity variations between the sea bottom and the target.

Time domain solutions to CSEM exist but are computationally even more costly than frequency domain methods. Although they offer clear advantages in handling the so-called air wave effect in land or shallow water surveys (the air wave is the direct transmission from the broadcasting antenna to the detecting antenna through the air), time domain analysis in the deep water case loses the advantages of the frequency domain method because the time domain response is spread across frequencies of little interest to hydrocarbon exploration for targets at typical reservoir depths.

Time domain electromagnetic data (i.e., as measured in a survey), and frequency domain electromagnetic data are related by the Fourier transformation:

$$D(f) = (1/2\pi)\int e^{-2\pi i f t} D(t) dt$$

Because $i=\sqrt{(-1)}$, it can be seen that electric and magnetic fields in the frequency domain are complex quantities (numbers that have real and imaginary parts). These quantities display characteristic variations with transmitter-to-detector offset, frequency, and transmitter direction which, under appropriate conditions, can be used to constrain subsurface variations in resistivity. The analysis and interpretation of electromagnetic data are carried out by a process of modeling likely geological situations and comparing these simulated data with actual measured data. Very often, the geologic models are adjusted and simulated again and again until an acceptable match between measured and computed data is achieved. When this process is carried out within a computer driven optimization scheme, it is referred to as an inversion.

The interpretation process, either a by hand comparison of models and measured data, or an actual inversion, benefits from the unusually high level of precision with which actual field recordings can be made. Experience now confirms that field recording can be accurate across a dynamic range of approximately seven orders of magnitude. This extraordinary dynamic range makes the CSEM technique sensitive to even the relatively thin targets of interest in hydrocarbon exploration. Unfortunately, the extreme accuracy of the data also makes simulation of the electromagnetic fields a very demanding computational task. Geologic bodies of actual interest are very rarely well approximated by a one dimensional model (layered models) or by a two dimensional model in which the geology is assumed to be unchanging in the perpendicular dimension. Very often the full complexity of a three dimensional (3-D) model must be confronted.

Models of actual interest can be treated by decomposing the 3-D resistivity volume into rectangular cells which are then used to numerically solve the system of equations which govern the electromagnetic fields. Two general classes of such models exist: isotropic models in which the cell conductivities (the reciprocal of resistivity) are independent of current direction, and anisotropic models in which the conductivities depend upon current direction. In general conductivity is a rank 2 tensor with components representing the current along the three Cartesian directions resulting from an applied electric field along each of three directions. The equations relating the electric and magnetic fields to imposed electric and magnetic current sources are known as Maxwell's equations and for typical CSEM data processing application they are expressed in the frequency domain. This approach is called the frequency domain finite difference (FDFD) method.

Two alternatives to the finite difference method ("FDM") of numerical solution exist for general 3-D models—the finite element method, hereinafter "FEM", and the integral equation method, hereinafter "IE." The FEM in which the resistivity grid is composed of more general geometric shapes than rectangles is more complex computationally than the FDM. The FEM is definitely preferred for engineering applications in which great detail is required. Aside from the water bottom topography, the attention to detail offered by the FEM appears not to be required in the application of CSEM to hydrocarbon exploration. Nearly all underlying physical and mathematical details of the FDM also apply to the FEM. The IE method recasts the system of differential equations implied by Maxwell's equations into an associated integral equation by making use of the properties of the Green's function for the electric and/or magnetic field in a uniform or layered model. A uniform or layered material is used for the reference Green's function because highly accurate and rapidly computed solutions are available for these models. The resulting integral equations naturally give rise to computational schemes that work very well for compact 3-D objects imbedded in uniform or layered models (such as a ship or aircraft in the deep ocean or high in the atmosphere). Unfortunately, IE methods appear to be poorly suited for modeling applications when the models exhibit significant variations nearly everywhere, as is expected in the hydrocarbon exploration case. An additional disadvantage of the IE method is that direct discretization of the integral equations gives rise to systems of equations which are highly non-sparse (the electric field unknowns obey equations for which all terms contribute).

Unfortunately, the equations of the FDFD method need to be solved for each frequency of interest and for each of the many thousands of transmitter positions occupied by the broadcasting antenna used in an actual survey. In three dimensions this is an enormous undertaking because of the volume of the earth affected by the broadcast signal. Typical models of interest contain one to ten million resistivity cells when account is taken of the necessary sampling requirements needed to obtain accurate numerical simulations and to avoid contamination of the solution by undesirable boundary effects caused by imposing a resistivity grid of finite size. The computational magnitude presented by a full inversion of an actual survey is so large as to be beyond the capabilities of even the very largest parallel computers, composed of tens of thousands of processors, operating for many months unless computational efficiencies are developed and applied.

One often suggested computational efficiency approach involves recognition of the fact that the transmitter locations are closely spaced (50 to 100 m) so that considerable computational efficiency might be found by simply making small corrections to an already computed solution for a nearby transmitter location. While the possibility exists that some method along these lines might be made to work, the present inventors have experimented several times with this procedure and found that correcting solutions from nearby transmitter locations is just as expensive as obtaining independent solutions for all transmitter locations when seeking solutions that reflect the high accuracy observed in the actual measured data.

Another computational efficiency approach [1] involves generating a complete factorization or decomposition of the Maxwell operator. In a sense this approach amounts to obtaining a solution for all source positions in a form which can be rapidly evaluated for any specific source location. To explain this, some further detail concerning numerical aspects of the FDFD method are required. Maxwell's equations in the frequency domain relate the time-harmonic electric and magnetic fields to the current densities of the impressed electric and magnetic transmitters. As long as one is not concerned with the electrostatic or magnetostatic (the DC) portion of these fields, one may mathematically eliminate the magnetic fields from the equations (this elimination gets into trouble at very low frequency where the electrostatic and magnetostatic contributions are no longer coupled; this is called the null-coupled problem). The resulting equation relates the electric field to the impressed electric transmitters (we assume that our earth model contains no variations in the magnetic permeability which is a good assumption unless ferric materials are nearby) by a system of equations which become a system of algebraic equations for the electric field on the resistivity grid. This system of equations takes the form:

$$Ke=j$$

where K is conceptually a square complex matrix of dimension 3N×3N where N is the number of cells in the 3-D resistivity grid (about one to ten million) and e and j are 3N-long column vectors representing the electric field unknowns at the grid nodes and the impressed transmitter electric current. The matrix K is symmetric because of the Reciprocity principle. Fortunately the matrix K is extremely sparse (in fact all but 13×3N of its 3N×3N elements are zero). The above equation is a system of 3N equations for the 3N electric field values on the grid. A fundamental theorem of linear algebra [1] requires that any m×n complex matrix is unitarily equivalent to a diagonal matrix, $$K=UDV^*.$$

In this equation, U and V are unitary matrices and D is diagonal. The asterisk denotes the adjoint or complex conjugate-transpose of the matrix V. The transpose of a matrix is a copy of the original matrix in which row and columns have been exchanged, $$V_{ij}^T=V_{ji}$$

The complex conjugate of a complex number $z=x+iy$ is the complex number $x-iy$. The superscript T denotes the transpose and i and j refer to specific matrix elements (i and j assume integer values from 1 to 3N). A diagonal matrix is zero except along the main diagonal. For the special case where K is square, U=V. This is called the singular-value decomposition of K. The non-zero elements of the diagonal matrix D are the singular values of K. Since a unitary matrix is, by definition, one in which the matrix inverse is equal to its adjoint (the matrix inverse is the matrix which produces the unit matrix when multiplied by the original matrix (from either side for square matrices)), $$U^{-1}=U^*$$

A singular-value decomposition or UDU* factorization of K produces the desired electric field solution via the equation, $$e=UD^{-1}U^*j$$

The singular-value decomposition in effect provides a unitary transformation to a new coordinate system in which the matrix K is diagonal. Once one knows what this coordinate system is, the process of determining the electric field solution for any transmitter is relatively inexpensive. Unfortunately, the computational cost of such decompositions is of order $(3N)^3$ making this approach too costly for 3-D models, but possibly affordable for 2-D models for which N will be approximately 100 times less than in 3-D (and therefore one million times less expensive for a decomposition because the cost is cubic in N). A variant of this approach which involves finding all of the singular values of K is to decompose the matrix K only up to given accuracy by means of an iterative procedure. The singular values in D can be sorted by magnitude from the biggest to the smallest. In fact, many are very close to zero. There exist iterative procedures for producing the decompositions with a cost of $(3N)^2$ operations per recovered singular value. Experiments with using nearby transmitter solutions as the starting point for iterative solutions demonstrate that the effective spectral radius (the range of significant singular values in D) required for accurate electric field solutions may be extremely broad so that this approximate approach may not be cost effective. Again in two dimensions this approach might work. This approach might be effective for the well logging problem because sources are always activated in a restricted portion of the model (the borehole). A further difficulty in the complete decomposition approach is that the most widely used mathematical algorithms do not lend themselves to a parallel implementation.

The present invention provides an alternative approach to efficient processing of 3D CSEM data.

SUMMARY OF THE INVENTION

In one embodiment, the invention is a computer-implemented method for efficiently solving Maxwell's electromagnetic field equations in the frequency domain by numerical methods (finite difference or finite element) to calculate (simulate) the response of a controlled source (transmitter) electromagnetic survey obtained from the subsurface region, for use in determining the resistivity structure of a subsurface region, said method comprising:

(a) constructing an initial multi-dimensional (2-D or 3-D) resistivity model of said subsurface region on a global grid, said model including a water layer and optionally an air layer, using available information on resistivity, formation structure and bathymetry in said region, and specifying the configuration of sources and detectors used in the survey;

(b) constructing a one-dimensional background resistivity model for the subsurface region, said model being a 1-D approximation of the multi-dimensional model;

(c) separating Maxwell's electromagnetic field equations so that the solution generated is the sum of a background field solution and a scattered field solution, said background field solution to use the one-dimensional background resistivity model and said scattered field solution to use the multi-dimensional resistivity model;

(d) invoking reciprocity for solving for both the scattered field solution and the background solution, wherein transmitter locations and receiver locations are interchanged, actual receiver locations thereby becoming computational transmitter locations;

(e) selecting a frequency in the transmitter's frequency spectrum;

(f) selecting a computational transmitter location;

(g) constructing a non-uniform computational mesh (grid) within a domain surrounding said selected transmitter location, with a maximum mesh spacing near domain boundaries based on electromagnetic skin depth for the selected frequency and a minimum mesh spacing near the computational transmitter location where grid spacing is reduced to account for steeply varying electromagnetic field values, and said domain extent being based on skin depth considerations;

(h) interpolating resistivity values from the global grid model to the non-uniform computational grid;

(i) computing a background field solution in the frequency domain by numerical methods or analytically;

(j) solving the electromagnetic field equations for the scattered field solution in the frequency domain on a computer by finite difference or finite element methods on the non-uniform computational grid for one or more electromagnetic field components, the solution being for at least one computational receiver location and taking as given information the interpolated resistivity values, transmitter signal generation parameters, and selected transmitter and receiver locations; and (k) combining the scattered field solution with the background field solution.

The inventive method may be used to adjust (update) the resistivity model by adding further steps comprising:

(l) repeating steps (f)-(k) for a plurality of computational source locations and a plurality of computational receiver locations;

(m) computing a squared error between computed field values and survey data, and then computing the gradient of said squared error at a plurality of locations in the subterranean region; and (n) updating the global multi-dimensional resistivity model based on evaluating the squared error at test locations chosen from consideration of the gradients.

BRIEF DESCRIPTION OF THE DRAWINGS

The present invention and its advantages will be better understood by referring to the following detailed description and the attached drawings in which.

Figures 1, 1A:
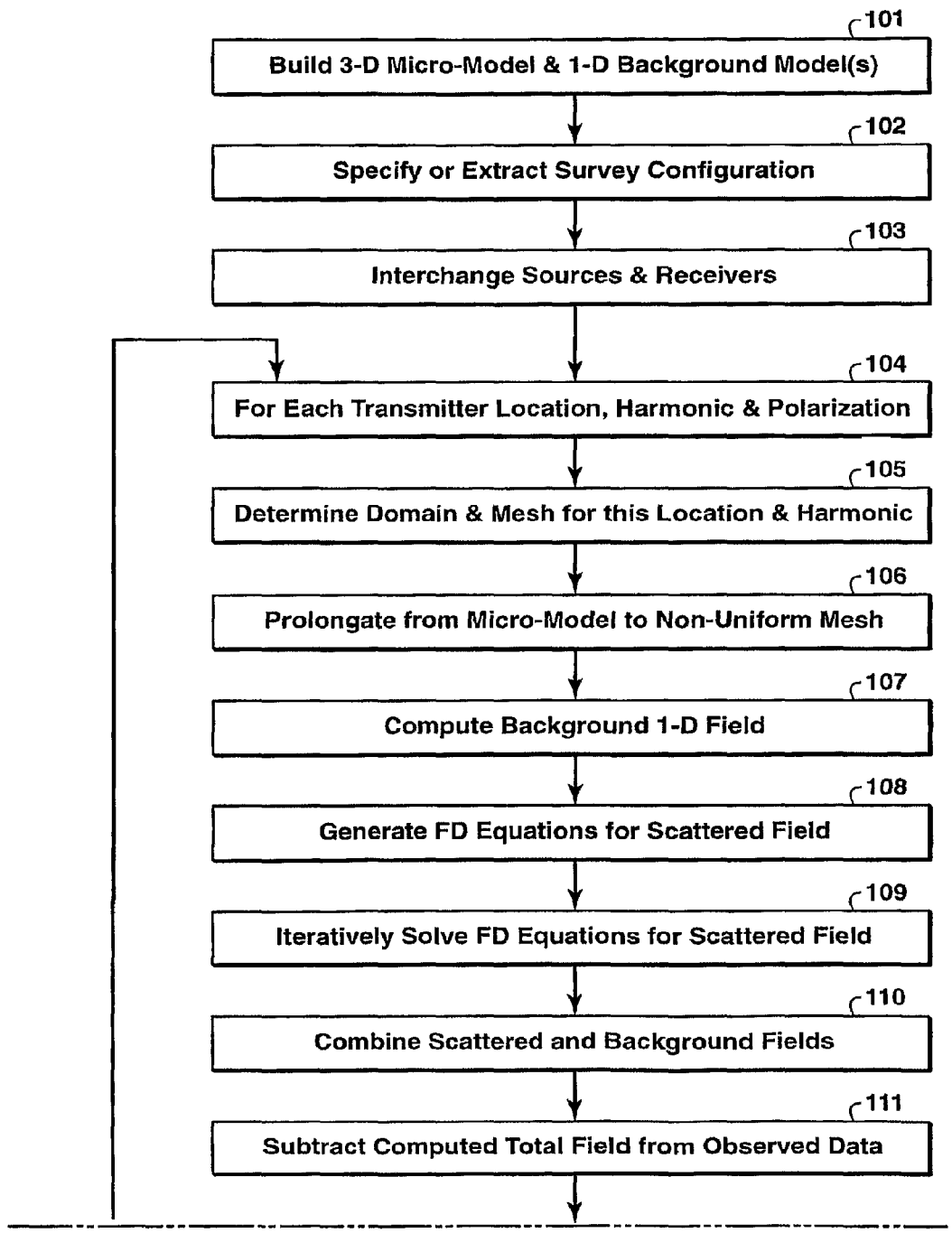
FIG. 1 is a flow chart showing some basic steps of one embodiment of the present inventive method (FIG. 1 is partitioned into FIGS. 1A and 1B)
Figure 1B:
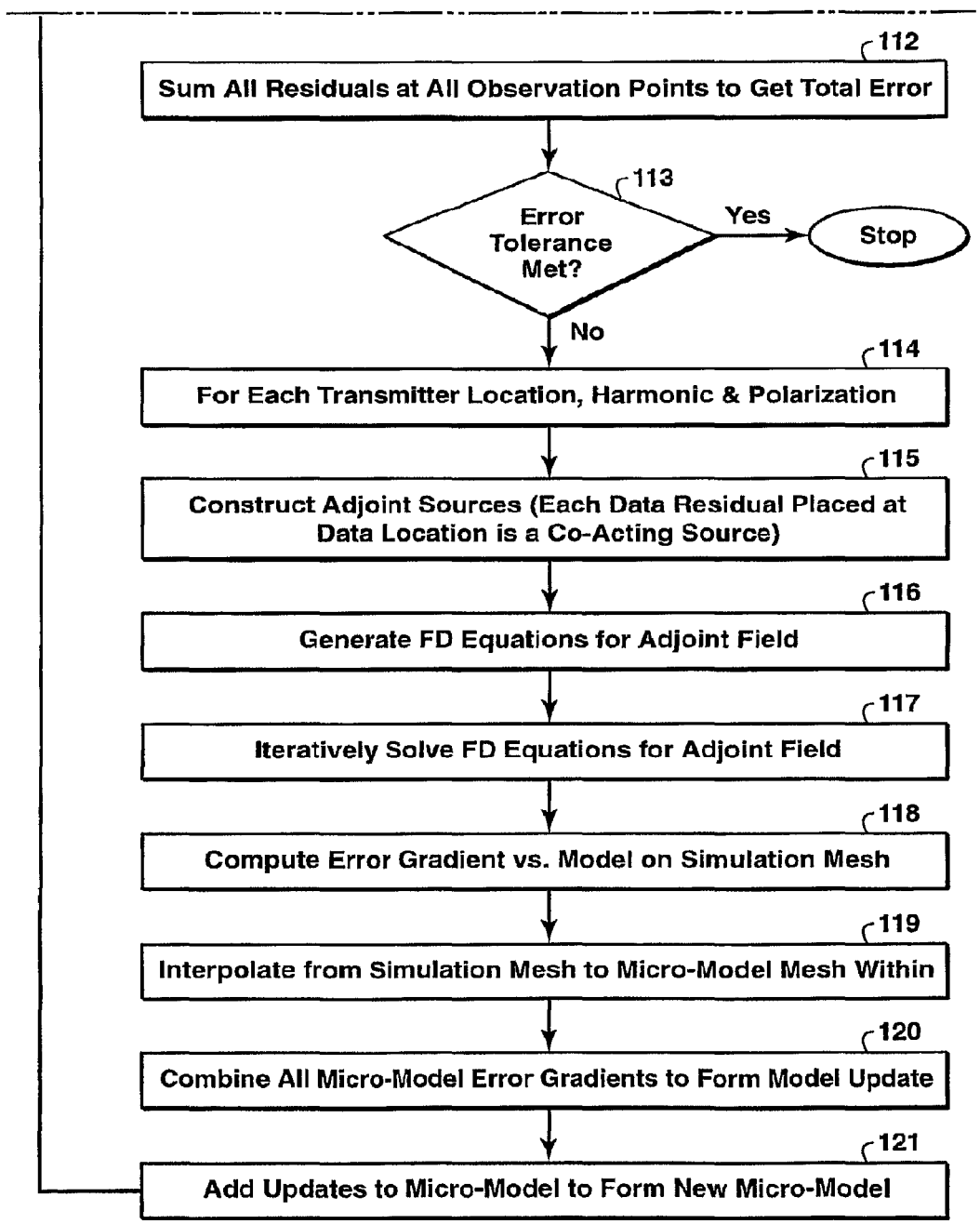

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a FDFD method for efficient processing of large volumes of CSEM data such as a 3D data set by using the Reciprocity principle and facilitating that technique by creating an optimal or near optimal computational multi-grid specific to each computational transmitter position and frequency to treat the rapidly varying fields there well enough to satisfy the conditions required for reciprocity and still obtain a computationally efficient solution.

The electromagnetic Reciprocity Principle of Lorentz [3,4] for transmitters and detectors, hereinafter the "Reciprocity Principle," asserts that under very general conditions there is a very close connection between the electromagnetic signals received by a detecting antenna from a broadcasting antenna, and the signals that would be received at the broadcasting antenna if the detecting antenna where to act as a transmitting antenna. Because actual marine resistivity surveys contain thousands of transmitter positions, but at most a few tens of detecting locations, it is far more efficient to simulate these surveys by using the implications of the Reciprocity Principle. This efficiency has been recognized in published papers reporting real or synthetic inversions of geophysical data collected in situations where the number of transmitter activations vastly outnumbers the number of detecting observations [5,6]. Reference [5] discloses an application of the Reciprocity Principle in seismology; reference [6] discloses applying reciprocity to the marine magnetometric resistivity (MMR) method. The Reciprocity Principle is also used for efficient evaluation of sensitive or Jacobian information in references [7-12]. Helicopter surveys that employ recordings of broadcast magnetic fields are one of many examples. Care must be taken, however, to insure that the actual computer codes that deliver the numerical approximations to solutions or inversions of Maxwell's equations in 3-D actually obey the implications of the Reciprocity Principle, and that is one of the problems solved by the present invention. This issue arises only in a 3-D (or 2-D) simulation and inversion situations. Due to the nature of the mathematical methods used to solve Maxwell's equations for layered (1-D) resistivity structures, 1-D solutions will obey the Reciprocity Principle to a very high level of accuracy.

A closely connected technical issue (i.e., closely connected to the solution of the problem of obtaining numerical results from an actual computer code that approximately obey the implications of the Reciprocity Principle to a satisfactory extent) is the problem of obtaining accurate and efficient numerical results for different frequencies and different transmitter locations, particularly when there are substantial 3-D variations near the transmitter. In other words, one needs to construct a finite difference grid for the solution of Maxwell's equations that insures that the requirements of the Reciprocity Principle are fulfilled well enough to allow the computationally efficient exchange of transmitters and detectors associated with the applications of CSEM to hydrocarbon exploration in the marine situation. In addition care must be taken to make sure that the convergence properties of the numerical optimization schemes used to perform inversions are preserved by the interpolation or prolongation transformations (and their adjoint) used to transform results between the underlying micro-model grid and the computationally efficient multi-grids. These issues may be collectively called the geometric modeling and inversion grid problem, or just the gridding problem. The adjoint of a transformation implemented by a matrix operation is the matrix transformation in which the rows and columns of the original matrix are exchanged and a complex conjugate is taken of the complex values. Stated as a formula (from the above example) the element at row i and column j of the adjoint transformation V* is equal to the complex conjugate of the element at row j and column i of the transformation V (where x and y represent the real and imaginary parts of the complex values of the elements of the matrix V):

$$(V^*)_{ij}=V_{ji}(x+iy \rightarrow x-iy)$$

The present invention overcomes these gridding problems by using the automatic generation of multiple FDM grids to implement the solutions to Maxwell's equations required for modeling and inversion studies used for actual hydrocarbon exploration problems. (The following disclosure relates as well to the FEM but will use the language of the FDM for illustrative purposes. The present inventive method can be used with either numerical solution technique). One aspect of the gridding problem arises because of the following reason. A transmitting dipole antenna (where a dipole is a bipole antenna of very short length) will display a singularity in the impressed electric field as the observation point approaches the antenna (r is tending to zero compared to the skin depth), $$E(r) \sim -\frac{\rho}{4\pi r^3}\left(p - 3\frac{p \cdot r}{r}\frac{r}{r}\right)$$

In this equation, $\rho$ is the resistivity, p is the dipole moment vector (the product of the dipole length and the current pointing in the direction of the dipole) and r is the position vector from the dipole to the observation point and r is the magnitude of r. The vector dot product p·r is p (the magnitude of p) times r times the cosine of the angle between the two vectors and p and r. This formula tells that the electric field produced by a dipole in the near field has two contributions: one part that points along the dipole direction and another part that lies along the direction of the observation vector.

Both contributions display a strong (cubic) singularity as r tends to zero. An actual bipole antenna can be treated as a sum of dipole elements and, although the summation process reduces the singularity along the bipole antenna, a singularity still appears at the grounded ends. Proper application of the finite difference technique demands that the grid sample the electric field behavior well enough to approximate the spatial derivatives of the electric field with numerical derivatives computed on the mesh. Far from the transmitter in materials with slowly changing resistivity, the required grid spacing is expressed by the skin depth. Close to the transmitter, the distance scale is set by the geometric singularity and this creates a serious issue for application of the finite difference method.

For the marine situation the numerical problem created by near-transmitter geometric singularities can be reduced by use of the scattered field method [13,14]. The scattered field method separates the total electric field solution into a background part plus an unknown scattered field part. The background part is chosen to obey Maxwell's equations at least for the portion of the model close to the transmitter. If the background field is easily and accurately computed, this reduces the numerical problems created by the transmitter singularity. The background field is usually chosen to obey a uniform or layered model (1-D) model (this was mentioned as part of the IE approach). When the actual model to be solved has a flat sea bottom and all 3-D target bodies are some distance (some hundreds of meters) from the sea bottom, the scattered field approach works well if the background solution is based on a layered model which contains air, sea water and the sea bottom sediments. Under such conditions the consistency of the Reciprocity Principle with the FDM electric field solution can be directly verified to a satisfactory degree of approximation. The difficulty is that the actual sea bottom topography cannot be ignored in modeling and inverting actual CSEM surveys because it is in the near field of the transmitting and recording devices. The actual sea bottom is never flat so that accurate models always contain resistivity variations that cannot be modeled by 1-D methods. These variations will extend to the sea bottom and will destroy the accuracy required of the electric field solutions needed to fulfill the requirements of the Reciprocity Principle. Plots of the electric field solutions show that, in essence, near field 3-D variations cause the scattered field to resemble the total electric field in its behavior near the transmitter thus destroying the advantages of the scattered field approach. One solution would seem to be use of an extremely fine finite difference grid everywhere. To capture the geometric singularity grid spacing of approximately 5 m are needed in situations where the skin depth, which controls the grid spacing far from the transmitter, is hundreds of meters (a skin depth should be less than 10 to never fewer than 5 FDM cell widths). Use of a fine grid would, therefore, increase the number of cells in each of the three dimensions by up to an order of magnitude thereby destroying the sought for computational efficiency. To make matters even worse, because of the breakdown of the coupling between electric and magnetic fields at low frequencies, spatially over-sampled FDM grids display very slow convergence when solved by iterative methods, this is an aspect of the null-coupled problem mentioned earlier. Grids with overly fine sampling contain a large number of nearly equal singular values. Each one of the solver iterations (approximately) recovers a single singular vector so that an accurate solution may require many thousands of iterations.

Instead, the present inventive method attempts to preserve the advantages of the scattered field method which allows the use of grids based on the skin depth, but to increase the accuracy of the FDM solution for the electric fields by automatically refining the FDM grid only near any transmitting antennas by use of automatic mesh refinement procedures based on the appropriate interpolation or prolongation. In the presence of a scattered field singularity close to the transmitter, the ideal mesh would contain cells with volumes which tend to zero as $r^3$ thereby canceling the singularity in the impressed electric field. Grids containing cells that are designed to cancel the impressed field singularity may exhibit an amplification of the null-coupling problem. If this occurs, the remedy is to add to the iterative solution process steps that specifically force the consequences of electric charge conservation to be obeyed by the electric field solution. When applied to solution of the inversion problem, this approach must be accompanied by the appropriate adjoint interpolation or prolongation to return from the FDM grid used for accurate and efficient solution for the electric fields to the micro-grid used to update the resistivity model.

A detailed description of certain features according to one embodiment of the present inventive method and how it might be used in CSEM practice is as follows:

1) Identify a prospective survey area using a priori information such as available seismic maps and seismic depth cross sections.

2) Construct initial three dimensional resistivity models by integrating sea bottom bathymetry data with interpretations of salt bodies and suspected reservoir sands. Use regional well log data to estimate sandstone, shale and other rock resistivities.

3) Design the marine CSEM survey with appropriate sail lines and frequencies to properly determine probabilities for potential hydrocarbon targets. In general, sail lines are preferably oriented so that they produce impressed electric currents that encounter the maximum possible target resistivity. Because of the very important need to differentiate between background resistivity and target resistivity, all surveys are preferably planned so that they include good sampling of specifically non-target zones.

4) Employ 3-D CSEM modeling to evaluate survey design and resolution. Cost effectiveness of the modeling can be improved by successful application of the following:

5) The initial 3-D resistivity model is sampled according to skin depth based criteria for the highest frequency of interest.
  a) For example suppose this is 2 Hz and the background sea bottom sediment resistivity is 1 ohm-m. The skin depth is approximately 356 m and an appropriate FDM cell width is 50 m for 7 horizontal cells per skin depth. The initial grid would ideally contain cells of dimension 50 m×50 m×50 m; however, additional sampling in the vertical direction may be necessary to capture thin reservoir models. For numerical stability, a useful guide is to avoid cells with horizontal to vertical aspect ratios greater than 5. Thus the minimum vertical cell would be 10 m in this example with up to 35 vertical cells per skin depth. For illustrative purposes, suppose, therefore, that this grid has cells of dimension 50 m×50 m×10 m.
  b) The underlying resistivity model is kept conceptually fixed during grid transformation processes. To this end, imagine that the highest frequency model composed of 50 m×50 m×10 m cells is itself defined by appropriate averaging of an underlying micro-model composed of 5 m×5 m×5 m cells. The 5 m cell dimension is set at the smallest grid interval of interest (see below). The 5 m sampled micro-model is automatically re-sampled for each transmitter location and frequency of actual interest. This is expressed by the grid relation, $$M_k = M(m, TX, \omega, k)$$

where $M_k$ denotes the averaged cell conductivity for cells appropriate to efficient modeling at frequency $\omega$, due to transmitter TX and along Cartesian direction k=1, 2, 3 for current along x, y, z and m denotes the entire micro-model grid. The directional dependence of the averaged cell conductivities reflects the inevitable fact that averages of variable conductivities in the micro-model grid will depend upon the averaging direction. The micro-model grid does not depend upon frequency or transmitter location. In general the micro-model conductivities may be either isotropic or anisotropic on the micro-cell level. The "large" cells of the grid M do indeed depend upon transmitter location, frequency, and averaging direction. Since the Reciprocity Principle is being invoked, the (computational) transmitter is actually a detector position in the real world survey. The appropriate averaging procedure to use in going from the micro-model grid to the computational multi-grids depends upon the direction of the electric current. For a current along, for example, the direction of the X-Cartesian axis, one first sums, over the "large" cell of grid M, the surface area fractions of micro-model cell conductivities of grid m in the perpendicular Y and Z-Cartesian directions according to the parallel circuit rule. Next, one sums, again over the "large" cells of grid M, the resulting resistivities according to the series circuit rule along the X-direction, the direction of current flow. This procedure produces the appropriate edge-based conductivity averages required by the FDM applied to the electric fields at least in the low-frequency direct current (dc) limit. This cell averaging procedure is disclosed in reference [15].

c) The initial grid preferably allows approximately 3 skin depths at the lowest frequency of interest between the grid boundaries and interior points where data will be analyzed. The lowest frequency of interest in a typical CSEM survey might be ⅛ Hz for which the skin depth is approximately 1423 m. A 3 skin-depth buffer zone is therefore 4269 m in this example. Surveys of actual interest can comprise areas of 50 km×50 km×20 km including the 3 skin depth buffers and 5 to 10 km for an air layer. Using 5 m cells, the micro-model model therefore can contain 10000×10000×4000 cells.

d) In addition, the local computation model can be truncated (to a smaller aperture) in recognition of the exponential decay experienced by electromagnetic radiation in conductive materials, i.e., in recognition of the skin depth effect. This is referred to as domain trimming. Typically a domain trimmed grid will place the transmitter approximately 12 to 15 skin depths from any boundary. Domain trimming speeds up computations with negligible loss of accuracy.

e) The desired output in this illustrative example is an FDM grid with fine (~5 m) spacing close to the transmitting antenna. As distance from the transmitter increases, the spacing smoothly changes to provide the sampling required from skin depth considerations. Thus each transmitter and each frequency have a unique grid designed to achieve rapid and accurate solution of Maxwell's equations.

f) Designing a computational grid for affordable yet stable and accurate FDM calculations at low frequencies can require a compromise between the need for fine sampling (i.e., fine mesh spacing) for accuracy near the transmitter and coarse sampling of long wavelengths to avoid excessive cost, while maintaining a reasonable aspect ratio required to achieve numerical stability. A reasonable set of rules for defining grid cell sizes could be:

i) Start by assuming a maximum aspect ratio (e.g. 5 or 6, for good numerical stability as discussed previously), and horizontal and vertical cell sizes appropriate for low-frequency modeling (e.g. 100 m and 20 m respectively for 0.5 Hz modeling).

ii) Make a selection list of candidate near-field cell sizes comprised of the first eight exact divisors of the vertical cell size (that is, values that divide evenly into that size; these are 20, 10, 6.67, 5.0, 4.0, 3.33, 2.86, and 2.5 m in the present example).

iii) For each candidate cell size in the selection list, multiply by the maximum aspect ratio and divide into the skin depth, obtaining the number of horizontal cells per skin depth corresponding to each candidate.

iv) Choose a candidate that yields cells per skin depth exceeding 6; if the first such candidate is not as small as desired for accurate calculation, select another candidate with cells per skin depth less than 10 to get finer sampling near the source at greater cost. For the selected minimum cell size, compute the corresponding maximum cell size by multiplying by the maximum aspect ratio.

v) If no suitable candidate is found, stop and evaluate whether the original model cell sizes are too fine for effective simulation of the desired frequency.

vi) Define the computational mesh using the final minimum and maximum cell sizes, as follows. Surround the source with a box of minimal cells, and extend the box in each direction by a margin comprising a small number (1 to 3) of additional minimal cells. Beyond the box margin, expand the grid in each direction out to the edge of the domain, growing the cell size by a modest factor (1.5 to 2) with each step away from the source box until the maximum cell size is reached. Adjust the vertical mesh to ensure that the air-water interface coincides with a cell boundary.

6) The domain trimmed FDM grid will normally contain approximately 250×250×200 cells, allowing for fine sampling close to the computational transmitter location. The scattered field formulation of the FDFD equations for the scattered electric fields may next be solved in the form $$Ke^s = j^s.$$

An iterative technique is used which, in essence, recovers a single singular value of K per iteration starting from the most significant singular value activated by the sourcing scattered current $j^s$ and proceeding in order of decreasing magnitude. This technique is called singular value decomposition, and is well known to persons of ordinary skill in the art (who will also know alternative techniques that may also be used in the present invention). On a well conditioned grid such as designed by an automatic mesh generation process of this invention such as the process described in section 5f above, usually less than approximately 2000 iterations are required; a process that requires 5 to 15 minutes on 32~3 GHz processors acting in parallel. The process may include iteration of the FDM equations designed to force conservation of electric charge to be obeyed by the numerical solution in order to filter out null-coupled solutions. Scattered electric fields at the detector positions are interpolated from the FDM grid. The total electric field solution is a sum of the background contribution (from the 1-D or uniform model) and the interpolated scattered electric field. Any computational detectors outside of the trimmed domain are assigned a zero result, computational detectors locations being transmitter locations in the actual survey. The same computation on the initial global grid would typically take more than 10 times longer.

7) The Reciprocity Principle states that the electric field Green's function in the complex-frequency domain in unbounded space for a model medium (denoted by the superscript A) with conductivity tensor $\sigma^A$, dielectric permittivity tensor $\epsilon^A$, and magnetic permeability $\mu^A$ measured along Cartesian direction i (i=1, 2, 3 for x, y, z) at a detector location $x_1$ due to a transmitting dipole current source at $x_2$ pointing along Cartesian direction j obeys the relation. ($\omega$ is the angular frequency expressed in radians per second, $\omega = 2\pi f$)

$$G_{ij}^{EJ,A}(x_1, x_2, \omega) = G_{ij}^{EJ,B}(x_2, x_1, \omega)$$

The superscript EJ denotes the electric field Green's function due to an electric current bipole, and the superscripts A and B refer to two different model media. Model medium B is related to medium A by the stipulation that media tensors $\sigma^B$, $\epsilon^B$, and $\mu^B$ are the transpose of the tensors $\sigma^A$, $\epsilon^A$, and $\mu^A$, $$\sigma_{ij}^B = \sigma_{ij}^A, \text{etc.}$$

In isotropic models, the three media tensors for conductivity, dielectric permittivity and magnetic permeability are proportional to the unit 3×3 matrix with the proportionality constant being the isotropic conductivity, etc. For the expected values of conductivity in conductive rock materials and the frequencies of importance to CSEM surveys conducted for hydrocarbon targets, the dielectric permittivity can be approximated by its free space value. Likewise, the magnetic permeability can be set to its free space value unless ferric materials are present in large volumes. For media in which the tensors are diagonal, the Reciprocity Principle requires that a complete symmetry exists between transmitting and detecting dipole antennas. The linearity of Maxwell's equations requires that for finite antennas, composed of bipole elements, the same result holds.

Figure 2:
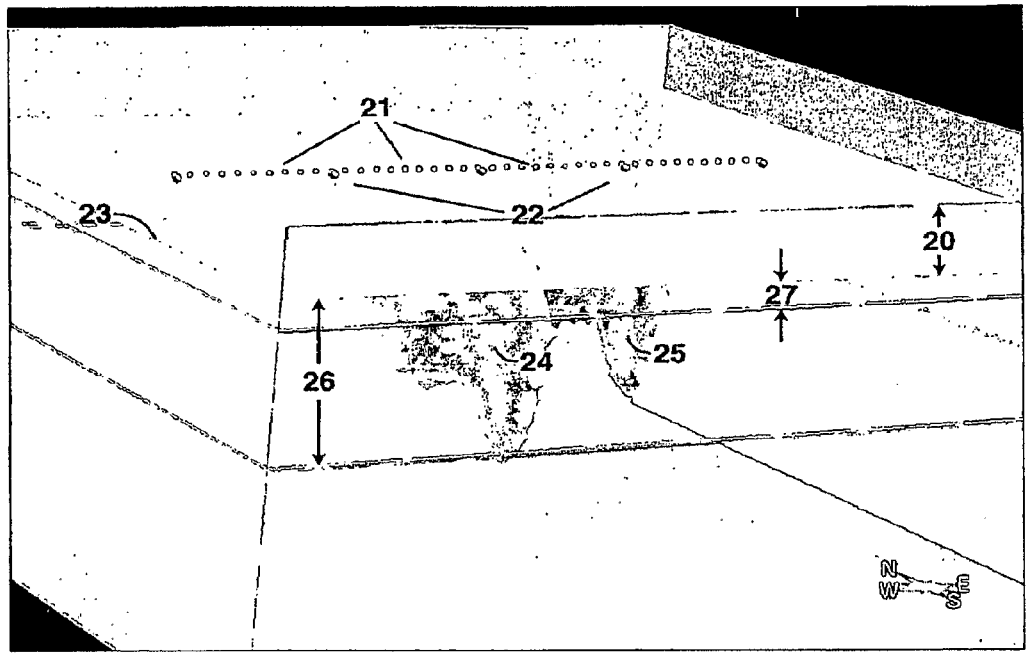
FIG. 2 is a resistivity model.

8) To be confident in the results of electric fields computation depending upon the symmetrical interchange of transmitting and detecting bipole antennas, it is appropriate to verify that the program gives the same results when used with reciprocally symmetric configurations. The results of three such experiments using the Earth model in FIG. 2 are presented in FIGS. 3 through 5. FIG. 2 shows the locus (tow-point positions) 21 of a bipole antenna towed in a water layer 20 slightly above a set of five stationary antennas (stations 22 evenly spaced at 2.5 km intervals along a west-east line) close to the water bottom 23 as in a typical survey. Symmetric configurations are obtained by running a second survey (not shown) with antenna towed through the original stationary points, with new stationary points placed on the original towline at the same X-coordinates as the previous stations. The Earth model consists of two salt bodies 24 and 25 embedded in a sedimentary medium 26 with a uniform east-to-west resistivity gradient (not shown in FIG. 2). The water bottom 23 is a plane slightly tilted to the northeast, and there is a layer 27 of uniform resistivity, 300 m thick, just below the water. The three experiments are performed using different orientations of the deeper antenna in the inline (E-W), vertical, and horizontal transverse (N-S) directions, respectively, with the shallower antenna always in the inline direction.

Figure 3:
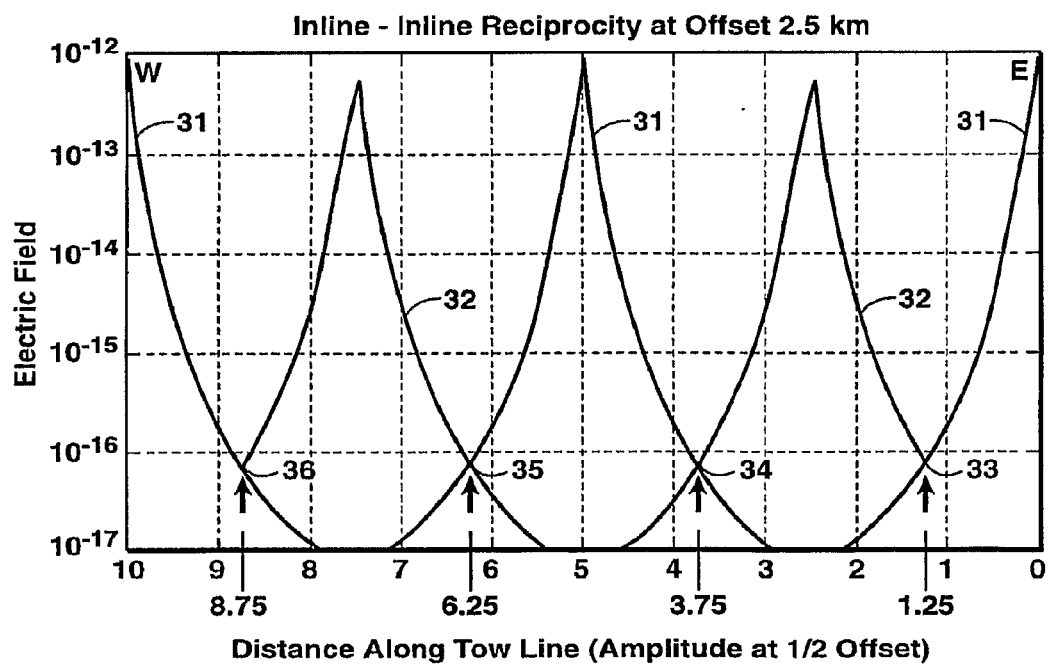
FIGS. 3-5 test various choices of computational grid mesh spacing for reciprocity, i.e., invariance to interchange of transmitter and receiver locations, in simulated calculations using the resistivity model of FIG. 2.

FIG. 3 shows electric field amplitudes for the inline antenna case, where the curves from the five stationary positions along the line are selected alternately from the primary (31) or symmetric (32) configuration, as indicated. Emphasis is placed on the positions at which the fields should have the identical values by plotting the tow-line amplitudes on a half-offset scale. Thus, the curves should have identical values, assuming conditions for reciprocity are satisfied, at positions mid-way between each station, i.e. at the following positions on the abscissa scale: 1.25, 3.75, 6.25, and 8.75 km, which positions are further indicated in FIG. 2 by the vertical arrows. The cross-over points 33, 34, 35, and 36 indeed occur at almost exactly these locations, and thus the plots show that the reciprocity experiment appears successful. Quantified results are included in tables below.

Figure 4:
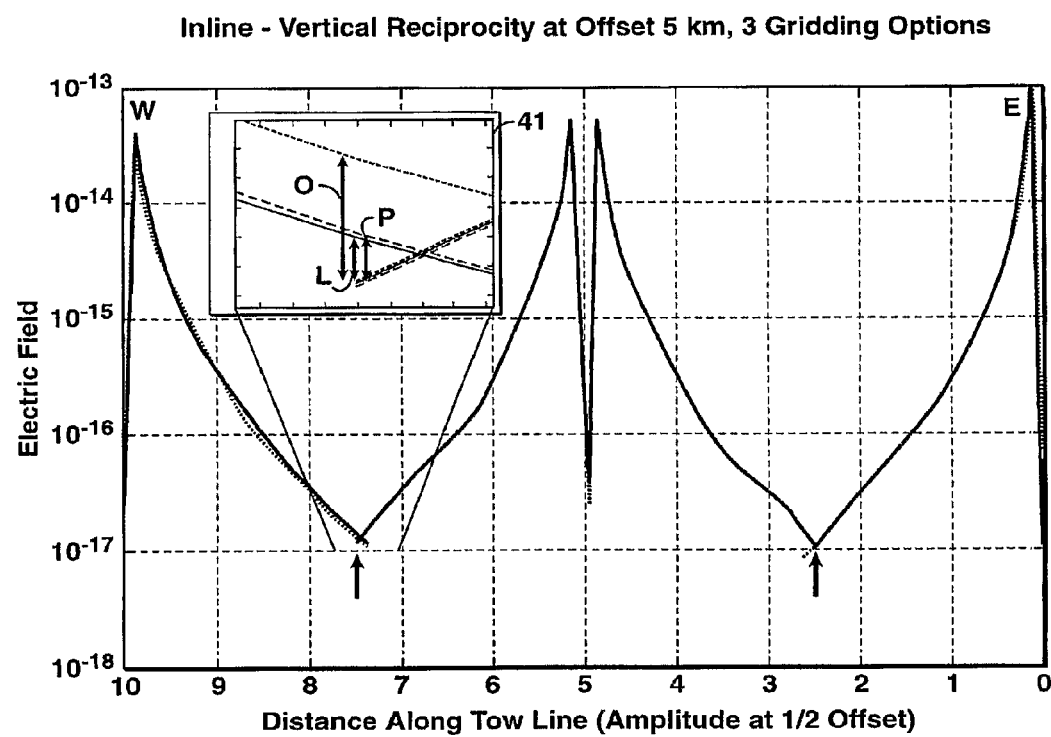

FIG. 4 shows results for stations at the 0, 5, and 10 km positions for antennas with vertical orientation. The data for the 5-km station are taken from the reciprocal experiment, so that the field values for the primary and reciprocal surveys should again be equal at the 2.5 km and at the 7.5 km positions (again indicated by vertical arrows). Three sets of curves are plotted over each other in this figure, representing results from different mesh interpolation techniques. The inset magnification 41 around one of the expected reciprocal points (~7.5 km) shows varying degrees of success in honoring the Reciprocity Principle; again, numerical results are presented in the tables below. The three cases having deviations from reciprocal behavior shown with double-headed arrows labeled O, L, and P are described as follows:

Case O ("original") uses the original mesh, with coarse uniform spacing in the X and Y directions. This case (with the two bold dashed curves) has the largest discrepancy from expected reciprocity. Accuracy is lost by not refining the mesh around the source with a nearby sharp resistivity contrast at the sloping water bottom.

Case L ("linear") uses a nonuniform mesh designed as described in section (5) above, with conductivity values linearly interpolated from the original input model. This mesh would be expected to give the most accurate simulation because of its careful design. Since the meshes are different for the two symmetric surveys (the sources being placed at different positions), a discrepancy is still seen between the two (solid line) curves for this experiment.

Case P ("preserve") uses an adjusted version of the designed non-uniform mesh, in which each node-points axis is locally stretched or compressed so that one of the nodes coincides with each node of the original mesh. This has the effect of preserving the original cells, but subdividing them to approximate the designed mesh. The resulting simulations (faint dashed lines) show improved accuracy over case O because of finer meshing near transmitters.

Figure 5:
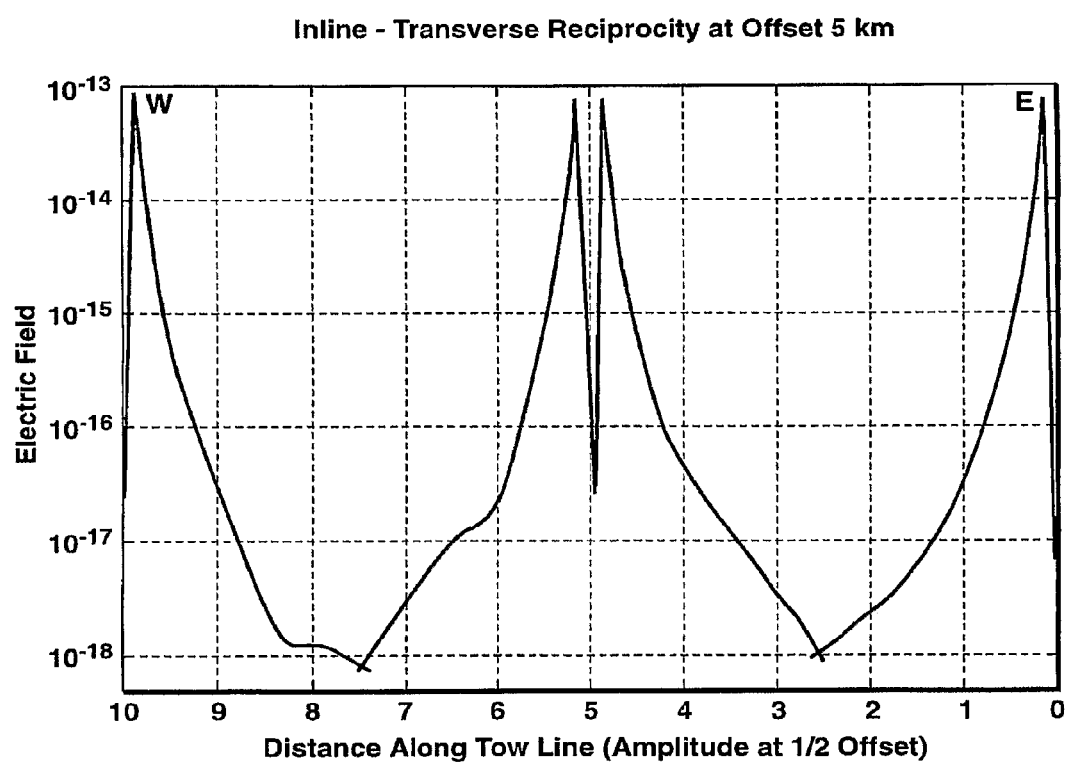

FIG. 5 shows successful computation of reciprocal configurations in the case of a horizontally transverse antenna.

Summary numerical results for these reciprocity experiments are tabulated below in Table 1, showing amplitude and phase results, with maximum errors reported for each configuration.

TABLE 1

Reciprocity Analysis — TwinSalt Tilt Model (Uniform "water-world" background model) — 28 Dec. 2005

Freq. 0.25 (14 data points, X offsets 2.5 & 5 km)

| Config | Component | Max amplitude error (percent) | | | Wgt avg phase error (degrees) | | |
|---|---|---|---|---|---|---|---|
| | | Org | Prsv | Linr | Orig | Prsv | Linr |
| Inline | Total | 0.65 | 1.12 | 1.74 | 0.34 | 1.37 | 1.69 |
| | Background | 0.48 | Max Amp = | 3.0E−13 | 0.48 | | |
| | Scattered | 0.57 | 1.49 | 2.69 | 0.34 | 1.12 | 1.42 |
| Vertical | Total | 7.53 | 3.65 | 7.49 | 0.40 | 0.27 | 1.32 |
| | Background | 0.00 | Max Amp = | 9.7E−14 | 0.00 | | |
| | Scattered | 6.38 | 3.06 | 6.27 | 0.29 | 0.27 | 1.13 |
| Transverse | Total | 2.54 | 2.43 | 2.62 | 0.22 | 2.65 | 1.96 |
| | Background | 0.41 | Max Amp = | 5.3E−14 | 0.12 | | |
| | Scattered | 2.36 | 2.79 | 2.73 | 0.29 | 3.34 | 1.95 |

Freq. 0.75 (8 data points, X offsets 2.5 km)

| Config | Component | Max amplitude error (percent) | | | Wgt avg phase error (degrees) | | |
|---|---|---|---|---|---|---|---|
| | | Org | Prsv | Linr | Orig | Prsv | Linr |
| Inline | Total | 2.65 | 2.25 | 2.93 | 0.81 | 0.72 | 0.87 |
| | Background | 1.04 | Max Amp = | 2.1E−14 | 1.21 | | |
| | Scattered | 2.61 | 2.23 | 2.88 | 0.79 | 0.67 | 0.84 |

TABLE 1-continued

| Reciprocity Analysis | | TwinSalt Tilt Model (Uniform "water-world" background model) | | | | 28 Dec. 2005 | |
|---|---|---|---|---|---|---|---|
| Vertical | Total | 6.93 | 3.66 | 4.36 | 2.64 | 2.03 | 3.03 |
| | Background | 0.04 | Max Amp = | 2.6E−15 | 0.01 | | |
| | Scattered | 7.01 | 3.65 | 4.30 | 2.63 | 2.06 | 3.07 |
| Transverse | Total | 4.96 | 4.82 | 4.36 | 6.59 | 7.19 | 7.29 |
| | Background | 0.59 | Max Amp = | 4.6E−15 | 0.22 | | |
| | Scattered | 4.88 | 4.65 | 4.20 | 6.26 | 7.07 | 6.98 |

Model re-gridding options:
Orig Use original grid (dx = 100m, min dz = 30m in this case).
Prsv Preserve original cells, but subdivide them to approximate designed mesh.
Linr Linear resampling of conductivity onto designed mesh.
Note: Reciprocal antenna pairs have Y-offset 100m, Z-offset 50m.

9) The automatic grid generation, iterative solution and output computational detector interpolation process is repeated until all computational transmitters and frequencies are modeled. If the task is a simulation, the computational process is complete.

10) For interpretation of survey data by human guided interpretation, the simulated results are compared with the actual data and with simulations from other similar models. Experience and an understanding of the underlying physical phenomena may be used to either guide a decision concerning hydrocarbon saturation, for example, or to guide an adjustment of the 3-D resistivity model to obtain a better match to actual survey data.

11) For an interpretation that will make use of an actual inversion, simulation of the survey data are followed by a numerical process designed to compute the gradient (derivative) of the squared error with respect to the resistivity cells. The least-squares error is a sum over all of the data of the squared modulus of the difference between the measured survey data (after processing) and the simulated data with appropriate data weights. The squared modulus of the complex number $z=x+iy$ is the sum $x^2+y^2$.

a) If a single FDM grid is used to represent the resistivity model for all computational transmitters and frequencies, the gradient of the squared error is conceptually well defined; however, when multiple FDM grids are used, the derivative concept may be extended in a manner that preserves the convergence properties of the numerical optimization methods used to drive the inversion process (a process designed to produce adjustments to the initial resistivity model that will eventually lead to a new resistivity model that fits the measured data to an acceptable degree) by appeal to the micro-model grid as follows: the optimization process is regarded as performed on the micro-model grid. The gradient of the electric fields, C, on the micro-model grid (the essential component of the gradient of the least-squares error with respect to the resistivity cells) is defined by application of the chain rule for differentiation (k=1, 2, 3, for x, y, z), $$\delta e/\delta m = \sum \delta e/\delta M_k \, dM_k/dm.$$

It may be recalled that the large cells of grid M depend upon frequency, transmitter, and current direction while, conceptually, the gradients of the electric fields on the micro-model grid do not for an isotropic model. This dependence is removed by the derivatives of the large grid function with respect to the micro-model grid $dM_k/dm$. These coefficients are given by differentiation of the parallel-series averaging procedure referred to in reference [15].

b) The result of this process is a numerical approximation to the gradient on the micro-model grid. This result is used to produce updates to the original resistivity model by a process that involves evaluating the squared error at test locations in model space determined by the gradient vector (see reference [16] for additional details).

c) Assuming that the desirable features of the numerical optimization scheme used to implement the inversion process are preserved by the prolongation and interpolation process used to maintain the low-frequency dc properties of the conductivities in the micro-model, the inversion updates to the initial resistivity model eventually match the actual survey data to an acceptable extent. Experience indicates that good convergence can be expected in 100 non-linear inversion updates or less when use is made of the non-linear-conjugate gradient optimization method. For a discussion of the non-linear-conjugate gradient optimization method and more sophisticated Gauss-Newton schemes see reference [2]. The Gauss-Newton schemes can converge much more rapidly, but at the price of increased computational costs for each non-linear update. Due to the typically high quality of CSEM data, fits of 95% or better between the recorded and simulated data can be reasonably expected.

d) The final inverted resistivity models may be interpreted based on correlation with seismic images, expectations based on by-hand model driven interpretation of CSEM survey data, and most importantly, understandings built up by conducting several inversions of the survey data starting from different initial models. At a minimum, inversions are usually performed starting with relatively featureless no-hydrocarbon models and from maximum case hydrocarbon models. This procedure produces estimates of the minimal HC (hydrocarbon) model consistent with the survey data, and the maximal HC model consistent with the data. Additionally, hypothesized reservoir geometry (usually constructed from seismic images) can be inserted in the initial models.

12) Parallel computer implementation can produce significant efficiencies in computations of this magnitude. Message passing may be used to parallelize the underlying FDM computations used in both the modeling and inversion computations. Such a program was licensed from Sandia National Laboratory. Computations running in parallel which use message passing make use of high speed communications networks to explicitly pass partial results between the processors. This approach avoids the use of shared memory (although shared memory can be used to pass messages if it is available) which, generally speaking, is expensive to implement. The price to be paid for the use of message passing is that the program must be designed from this perspective. Such parallel programs may be extended to incorporate parallelization over frequency and computational transmitter location so that both the simulations and gradient computations are carried out with multiple FDFD computations proceeding in parallel. Such programs can take full advantage of computer systems of up to many thousands of processors running in parallel and using message passing to exchange the required data.

13) The net effect of the computational efficiencies and parallel implementations disclosed above is to make highly accurate, fully 3-D modeling and inversion of CSEM surveys a practical procedure to be employed in a business-timely manner for the interpretation of hydrocarbon prospects for the purpose of exploration risk reduction, prospect assessment and prospect development.

FIG. 1 is a flow chart summarizing steps in one embodiment of the present inventive method. At step 101, two resistivity models of the subject subsurface region are constructed from available information: an initial 3-D micro-model (which will be updated in the course of the process) and a background resistivity model (no resistive bodies, typically a 1-D (horizontally-layered) model). At step 102, the survey configuration information is obtained. This includes precise source and receiver positions as a function of time. At step 103, interchange sources and receivers, i.e. actual source positions become receiver positions for computational purposes, and actual receiver locations become computational source locations.

Next, at step 104, a (computational) transmitter (source) location is selected, a particular frequency (harmonic) in the source's frequency spectrum is selected, and a polarization is selected. The term polarization means the direction of the electric or magnetic field to be analyzed. Polarization refers to the vertical, inline or perpendicular directions where the vertical direction is up and down, the inline direction is the direction along the survey or boat sail direction, and the perpendicular direction is the horizontal direction perpendicular to the inline direction. At step 105, a domain and a computational mesh is selected for the selected source location and frequency. The mesh is non-uniform, with finer spacing near the source location. At step 106, resistivity values in the cells in the computational mesh are obtained from the 3-D micro-model by interpolation or prolongation. The preferred averaging procedure to follow will be correct in the low-frequency (direct current) limit and, in general, will depend upon the current direction. It will produce anisotropic models on the computational multi-grids even when the underlying micro-models are isotropic.

At step 107, the background 1-D electric (or magnetic) field is computed, solving Maxwell's field equations for each computational receiver location using the selected source location and frequency and the 1-D background resistivity model. Typically, this problem is simple enough to be solved analytically. At step 108, finite difference field equations are generated for the scattered field, and at step 109 these equations are iteratively solved on the variable mesh. The scattered and background fields are then combined to obtain a computed total field (step 110). When the iterated field solutions are thus computed for each computational transmitter and each frequency of interest, the process of simulating the electric or magnetic field is completed. If simulating the EM field is the end objective, the process stops here.

Typically, the reason one simulates the field in CSEM data processing is in order to compare to the measured CSEM data and then adjust the initial resistivity model, repeating the process until satisfactory agreement is reached with measured data, yielding a final resistivity model. Or, instead of forward modeling, the resistivity model can be obtained by an inversion process which is also iterative. If by-hand human interpretation (i.e. forward modeling) is being used to steer a simulation toward a match with real data, differences between actual processed data and simulated data are studied from the point of view of experience and the resistivity model is adjusted and re-simulated until a desired match is obtained. In this situation a human being makes the model adjustments. In by-hand interpretation, only models are examined that are considered likely by the interpreter. Due to it's reliance upon human understanding of how to modify a resistivity model in order to improve the match between simulated and actual data, only relatively small datasets can be exhaustively examined. If an inversion is being used, the adjustments are made by a numerical optimization process. An inversion can confront very large datasets but require substantial computing resources. FIG. 1 summarizes the inversion procedure as follows.

At step 111, the computed total electromagnetic field from step 110 is subtracted from the measured and processed observed data value from the CSEM survey for the selected coordinates and frequency to obtain the residual (error) at that observation point for the current iteration cycle. This result may be multiplied by a suitable error weight to form the contribution of each data point to a (weighted) least-squares error measure. At step 112, the individual error contributions are summed to form the total least-squares error measure for all transmitter locations, all frequencies and data locations. At step 113, the value of the summed least-squares error is tested to determine if a sufficiently good match (e.g., using a predetermined error tolerance) has been obtained between the current resistivity model and the measured and processed data. If a sufficiently good match has been obtained the process ends; if not, the process continues with step 114 where the contribution to the gradient of the least-squares error function (with respect to the resistivities of the micro-model) of each transmitter location, frequency harmonic and electric or magnetic field polarization is computed by the following process.

At step 115, an adjoint source current is constructed by assigning each weighted data residual associated with a given transmitter location, frequency harmonic and magnetic or electric field polarization to its location in the computational multi-grid. At step 116, FDM equations for the adjoint field are constructed on the computational multi-grids. At step 117, Maxwell's equations in the frequency domain are solved on the computational multi-grid for the adjoint electromagnetic fields produced by the adjoint source current. At step 118, the contribution to the gradient of the least-squares error which respect to the computational multi-grid is computed for each transmitter location and each frequency. At step 119, the adjoint interpolation or prolongation of each contribution to the gradient of the least-squares error onto the micro-model grid is computed. At step 120, the contribution of all transmitter locations and frequencies are summed to obtain the total gradient of the least-squares error on the micro-model grid. When necessary, zeroes are inserted for values outside of the computational multi-grids when values are summed into the micro-model grid. An update to the micro-model may then be obtained by suitable scaling (if using the steepest descents or non-linear conjugate gradients optimization method) of the total gradient of the least-squares error on the micro-grid (Step 121). The Gauss-Newton optimization method (see reference [2]) may be used, in which case the total gradient is multiplied by a suitable approximation of the inverse normal matrix such as a diagonal approximation using ID results or a conjugate-gradient approximation to the action of the inverse normal matrix. Use of these or other optimization variants is optional in performing the present inventive method.

After step 121, the process returns to step 104 for re-computation of the least-squares error between the measured and simulated data. The process continues until the stopping condition of step 113 is satisfied.

The present invention is not primarily about the details of solving Maxwell's equations by numerical methods on non-uniform grids, or how to combine such software in a program that will yield a resistivity model from CSEM data by forward modeling or inversion. Basic techniques for doing these things are known. Instead, the present invention consists of certain improvements to these known techniques to make such calculations more efficient and cost effective. Software used for testing some aspects of the present inventive method was provided by Dr. Gregory A. Newman and Dr. Michael Commer of Lawrence Berkeley National Laboratory, University of California, Earth Sciences Division, MS 90-1116, 1 Cyclotron Road, Berkeley, Calif. 04720.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

1. Golub, G. H., Van Loan, C. F., [1983], *Matrix*, The Johns Hopkins University Press, Baltimore, Md., ISBN 0-8018-3010-9.
2. Dennis, J. E., Schnabel, R. B., [1983], *Numerical Methods for Unconstrained Optimization and Nonlinear Equations*, Prentice-Hall, Englewood Cliffs, N.J., ISBN 0-13-627216-9.
3. Lorentz, H. A., [1896], Het theorema van Poynting over de energie van het electromagnetisch veld en een paar algemente stellingen over de voortplanting van het licht, Verlagen Kon. Akademier van Wetenschappen, Band 4, p 176, Amsterdam.
4. De Hoop, A. T., [1995], *Handbook of Radiation and Scattering of Waves*, Academic Press, London, ISBN 0-12-208644-4.
5. Eisner, L., Clayton, R. W., [2001], "A reciprocity method for multi-source simulations," *Bulletin of the Seismological Society of America*, 91, 553-560.
6. Chen, J., Oldenburg, D. W., and Haber, E., [2005], "Reciprocity in electromagnetics: application to modeling marine magnetometric resistivity data," *Physics of the Earth and Planetary Interiors* 150, 45-61.
7. Yutaka, S., [1994], "3-D resistivity inversion using the finite-element method, Geophysics," 59, 1839-1848.
8. De Lugao, P. P, Wannamaker, P. E., [1996], "Calculating the two-dimensional magnetotelluric Jacobian in finite elements using reciprocity," *Geophysical Journal International* 127, 806-810.
9. Yi, M. J., Kim, J. H., Cho, S. J., Chung, S. H., Song, Y., "Three-dimensional imaging of sub-surface structures using resistivity data,", *Geophysical Prospecting* 49, 483-497 (2001).
10. Sasaki, Y., [2001], "Full 3-D inversion of electromagnetic data on a PC," *Journal of Applied Geophysics* 46; 45-56.
11. Wang, T., Mezzatesta, A., [2001], "Fast Frechet derivative calculation using an auxiliary source array method; an application to array resistivity measurements, Geophysics," 66; 1364-1371.
12. Shin, C., Yoon, K., Marfurt, K. J., Park, K., Yang, D., Lim, H. Y., Chung, S., Shin, S., [2601], "Efficient calculation of a partial-derivative wavefield using reciprocity for seismic imaging and inversion," *Geophysics* 66, 1856-1863.
13. Mie, G., [1906], *Ann. D. Physik* (4), 25, 377.
14. Born, M., Wolf, E., [1959], *Principles of Optics*, Pergamon Press, Oxford, UK.
15. Moskow, S., Druskin, V. L., Hasashy, T., Lee, P., Davydycheva, S., [1999], "A finite difference scheme for elliptic equations with rough coefficients using a cartesian grid with non-conforming interfaces," *SIAM Journal on Numerical Analysis* 36, 442-464.
16. Newman, G. A., Alumbaugh, D. L., [1997], "Three-dimensional massively parallel electromagnetic inversion 1," *Geophysics Journal International* 128, 345-354.

The invention claimed is:

1. A computer-implemented method for efficiently simulating the electromagnetic field measurements in a controlled source (transmitter) electromagnetic survey obtained from a subsurface region, said simulation being for use in determining the resistivity structure of the subsurface region, said method comprising:
   (a) constructing an initial multi-dimensional (2-D or 3-D) resistivity model of said subsurface region on a global grid, said model including a water layer and optionally an air layer, using available information on resistivity, formation structure and bathymetry in said region, and specifying the configuration of sources and detectors used in the survey;
   (b) constructing a one-dimensional background resistivity model for the subsurface region, said model being a 1-D approximation of the multi-dimensional model;
   (c) separating Maxwell's electromagnetic field equations so that the solution generated is the sum of a background field solution and a scattered field solution, said background field solution to use the one-dimensional background resistivity model and said scattered field solution to use the multi-dimensional resistivity model;
   (d) invoking reciprocity for solving for both the scattered field solution and the background solution, wherein transmitter locations and receiver locations are interchanged, actual receiver locations thereby becoming computational transmitter locations;
   (e) selecting a frequency in the transmitter's frequency spectrum;
   (f) selecting a computational transmitter location;
   (g) constructing a non-uniform computational mesh (grid) within a domain surrounding said selected transmitter location, with a maximum mesh spacing near domain boundaries based on electromagnetic skin depth for the selected frequency and a minimum mesh spacing near the computational transmitter location where grid spacing is reduced to account for steeply varying electromagnetic field values, and said domain extent being based on skin depth considerations;
   (h) interpolating resistivity values from the global grid model to the non-uniform computational grid;
   (i) computing a background field solution in the frequency domain by numerical methods or analytically;
   (j) solving the electromagnetic field equations for the scattered field solution in the frequency domain on a computer by finite difference or finite element methods on the non-uniform computational grid for one or more electromagnetic field components, the solution being for at least one computational receiver location and taking as given information the interpolated resistivity values, transmitter signal generation parameters, and selected transmitter and receiver locations; and
   (k) combining the scattered field solution with the background field solution, and outputting the results or storing them in computer memory.

2. The method of claim 1, further comprising:
   (l) repeating steps (f)-(k) for a plurality of computational receiver locations and a plurality of computational transmitter locations, and comparing total computed electromagnetic field component values at the plurality of actual receiver positions to the survey measurements, then adjusting the multi-dimensional resistivity model, and then repeating steps (h)-(l) until said computed electromagnetic field component values converge to said survey data within a predetermined convergence criterion or until a predetermined stopping point is reached.

3. The method of step 2, wherein said plurality of computational transmitter locations are all computational source locations in the survey, and steps (e)-(l) are repeated for all frequencies having an associated amplitude in the transmitter's frequency spectrum greater than a pre-selected criterion value.

4. The method of claim 2, wherein the one-dimensional background resistivity model is held fixed.

5. The method of claim 1, further comprising:
(l) repeating steps (f)-(k) for a plurality of computational source locations and a plurality of computational receiver locations;
(m) computing a squared error between computed field values and survey data, and then computing the gradient of said squared error at a plurality of locations in the subterranean region; and
(n) updating the global multi-dimensional resistivity model based on evaluating the squared error at test locations chosen from consideration of the gradients.

6. The method of claim 5, further comprising repeating steps (h)-(n) until the resistivity model's values converge within a predetermined convergence criterion or until a predetermined stopping point is reached.

7. The method of claim 5, wherein Fourier prolongation is used to determine resistivity updates on the global grid from the squared error results on the computational multi-grid.

8. The method of claim 7, wherein non-equally spaced Fast Fourier Transformation is used for interpolation and prolongation.

9. The method of claim 5, wherein said gradients are calculated on a uniform micro-model grid having a mesh spacing determined by the smallest mesh spacing in the non-uniform computational grid.

10. The method of claim 9, wherein a plurality of non-uniform computational grids are used for a plurality of computational transmitter locations, but a single micro-model grid is used regardless of transmitter frequency, computational transmitter location, and polarization, and said computing the gradient step is performed on the micro-model grid by application of the chain rule for differentiation from the calculus of complex functions.

11. The method of claim 10, wherein said chain rule for differentiation is mathematically expressed as $$\delta e / \delta m = \sum_k \delta e / \delta M_k \, dM_k / dm$$

where e is electric (or magnetic) field, $M_k$ is a direction-dependent (anisotropic) conductivity for a cell in the computational grid and m is an isotropic conductivity for a cell in the micro-model grid, and the summation $\Sigma$ is over k=1,2,3, for orthogonal cartesian coordinates (x,y,z) and includes all cells of the computational grid that depend upon properties of cell m.

12. The method of claim 1, wherein the computer is a parallel processor, programmed to incorporate parallelization over frequency and computational transmitter location.

13. The method of claim 1, further comprising checking the non-uniform grid mesh spacing by running a pair of model simulations using the same resistivity models with interchanged transmitter and receiver locations, comparing simulated fields, and reducing mesh spacing near computational transmitter locations if reciprocity is not satisfied to within a pre-determined tolerance.

14. The method of claim 1, wherein the domain of the non-uniform computational grid allows approximately 3 skin depths, at a lowest frequency of interest, between the domain's boundaries and interior points where data will be analyzed.

15. The method of claim 1, wherein the non-uniform computational grid has mesh spacing in an (x,y,z) coordinate system such that the mesh spacing in the x-direction varies only with x, the mesh spacing in the y-direction varies only with y, and the mesh spacing in the z-direction varies only with z.

16. The method of claim 1, wherein the initial global resistivity model is three dimensional, with a vertical spacing determined by consideration of thinnest expected resistive layers, and with spacing in the horizontal dimensions not exceeding five times the vertical spacing.

17. The method of claim 1, wherein the non-uniform computational grid mesh spacing is increased from the minimum spacing near the computational transmitter location to the maximum spacing near the domain boundaries by increasing the spacing in steps by a factor not exceeding 2 until the maximum spacing is reached.

18. The method of claim 1, wherein the finite difference or finite element electromagnetic field equations for the scattered field solution on the non-uniform computational grid are expressed in matrix notation, and are solved by singular value decomposition.

19. A finite-difference, frequency-domain method for determining the resistivity structure of a subsurface region from controlled source electromagnetic survey data, comprising modeling simulated data and comparing them with actual measured data to obtain resistivity structure, wherein Maxwell's Equations are solved to simulate electromagnetic field measurements of the survey, said solution using the electromagnetic reciprocity principle and a non-uniform computational mesh (grid) to reduce mesh spacing near computational transmitter locations to account for steeply varying electromagnetic field values there.

20. The method of claim 19, wherein mesh spacing reduction near computational transmitter locations is determined by balancing competing considerations of satisfying conditions required for reciprocity with obtaining a computationally efficient solution.

21. The method of claim 19, wherein the modeling and comparison to measured data is repeated until a match is achieved within a pre-set acceptability criterion, using a computer driven optimization scheme.

* * * * *